United States Patent [19]
Furuta

[11] Patent Number: 5,698,837
[45] Date of Patent: Dec. 16, 1997

[54] METHOD AND SYSTEM FOR IDENTIFYING AND COMMUNICATING WITH A PLURALITY OF CONTACTLESS IC CARDS

[75] Inventor: Shigeru Furuta, Itami, Japan

[73] Assignee: Mitsubishi Denki Kabushiki Kaisha, Tokyo, Japan

[21] Appl. No.: 540,092

[22] Filed: Oct. 6, 1995

[30] Foreign Application Priority Data

Oct. 28, 1994 [JP] Japan .................................. 6-265677

[51] Int. Cl.⁶ .................................................. G06K 19/06
[52] U.S. Cl. ...................... 235/492; 235/377; 235/380; 902/26; 340/825.31; 340/825.34
[58] Field of Search .................... 235/492, 377, 235/380, 436, 454, 487; 902/26; 340/825.31, 825.34, 825.54, 825.33, 825.35

[56] References Cited

U.S. PATENT DOCUMENTS

| | | | |
|---|---|---|---|
| 4,143,241 | 3/1979 | Aranguren et al. | 179/15 |
| 4,188,578 | 2/1980 | Reudink et al. | 325/4 |
| 4,232,197 | 11/1980 | Acampora et al. | 455/12 X |
| 4,388,524 | 6/1983 | Walton | 235/380 |
| 4,546,241 | 10/1985 | Walton | 235/380 |
| 4,730,305 | 3/1988 | Acampora et al. | 370/60 |
| 4,822,990 | 4/1989 | Tamada et al. | 235/380 X |
| 5,068,521 | 11/1991 | Yamaguchi | 235/492 |
| 5,191,192 | 3/1993 | Takahira et al. | 235/375 |
| 5,266,925 | 11/1993 | Vercellotti et al. | 340/572 |
| 5,382,778 | 1/1995 | Takahira et al. | 235/492 X |
| 5,477,215 | 12/1995 | Mandelbaum | 235/380 X |

FOREIGN PATENT DOCUMENTS

| | | |
|---|---|---|
| 0-333-459-A2 | 9/1982 | European Pat. Off. . |
| 0161779 | 11/1985 | European Pat. Off. . |
| 0427342 | 5/1991 | European Pat. Off. . |
| 0494114 | 7/1992 | European Pat. Off. . |
| 0495708 | 7/1992 | European Pat. Off. . |
| 62-203289 | 9/1987 | Japan . |
| 62-206472 | 9/1987 | Japan . |
| 2-227792 | 9/1990 | Japan . |
| 4-47389 | 2/1992 | Japan . |
| 2259227 | 3/1993 | United Kingdom . |
| 2283600 | 5/1995 | United Kingdom . |

OTHER PUBLICATIONS

Roy Want et al, "Active Badges And Personal Interactive Computing Objects", IEEE Transaction on Consumer Electronics, vol. 38, No. 1, pp. 10–20, Feb. 1992.

Roy Want et al, "The Active Badge Location System", ACM Transactions On Information Systems, vol. 10, No. 1, pp. 91–102, Jan. 1992.

Primary Examiner—Donald T. Hajec
Assistant Examiner—Michael G. Lee
Attorney, Agent, or Firm—Leydig, Voit & Mayer, Ltd.

[57] ABSTRACT

Even when a plurality of cards have entered an communication area, the cards within the communication area may be accessible, and, if a data collision occurs, the order of accessing to the cards is expeditiously determined to perform an efficient communication. Each card determines a timing for returning a response block containing an ID code based on conditions directed by a read/write device and the ID code of its own. The read/write device is caused to receive the response block returned by the contactless IC card and to detect a data collision. Based on this result, the conditions are changed so that a respective response block containing an ID code is returned again, thereby concurrently processing the plurality of contactless IC cards.

6 Claims, 9 Drawing Sheets

ID_REQ(bn) BLOCK

| STCR | LEN | ID_REQ | bn | CND1 | TOF1 | CND2 | TOF2 | • • • | ECC |

FIG. 3B

COMMAND BLOCK-A

| STCR | LEN | COM1 | ID_X1 | TW1 | PAR1 | COM2 | ID_X2 | TW2 | PAR2 | • • • | ECC |

FIG. 3C

COMMAND BLOCK-B

| STCR | LEN | COM | ID_X1 | ID_X2 | • • • | PAR | TW | ECC |

FIG. 4

RESP(ID_X) BLOCK

| STCR | LEN | ID_X | RESP | ECC |

ID_REQ(bn)+COM(ID_X) BLOCK

| STCR | LEN | ID_REQ | bn | CND1 | TOF1 | ··· | COM1 | ID_X1 | TW1 | PAR1 | ··· | ECC |

METHOD AND SYSTEM FOR IDENTIFYING AND COMMUNICATING WITH A PLURALITY OF CONTACTLESS IC CARDS

BACKGROUND OF THE INVENTION

1. Field of the Invention

The present invention relates to a contactless IC card system for performing data communication by means of an electromagnetic wave and, more particularly, to 2 system and communication method in which communication may be normally performed even when a plurality of contactless IC cards concurrently enter into the range capable of communication with a reader/writer.

2. Description of the Related Art

Contactless IC cards are utilized to perform data communication with associated reader/writers, which are separated from each other, and are used for example in factory automation, transport system, control over physical access to a room, behavioral investigation, etc. Such contactless IC card processes include write-in, read-out and data processing functions.

Figure 11:
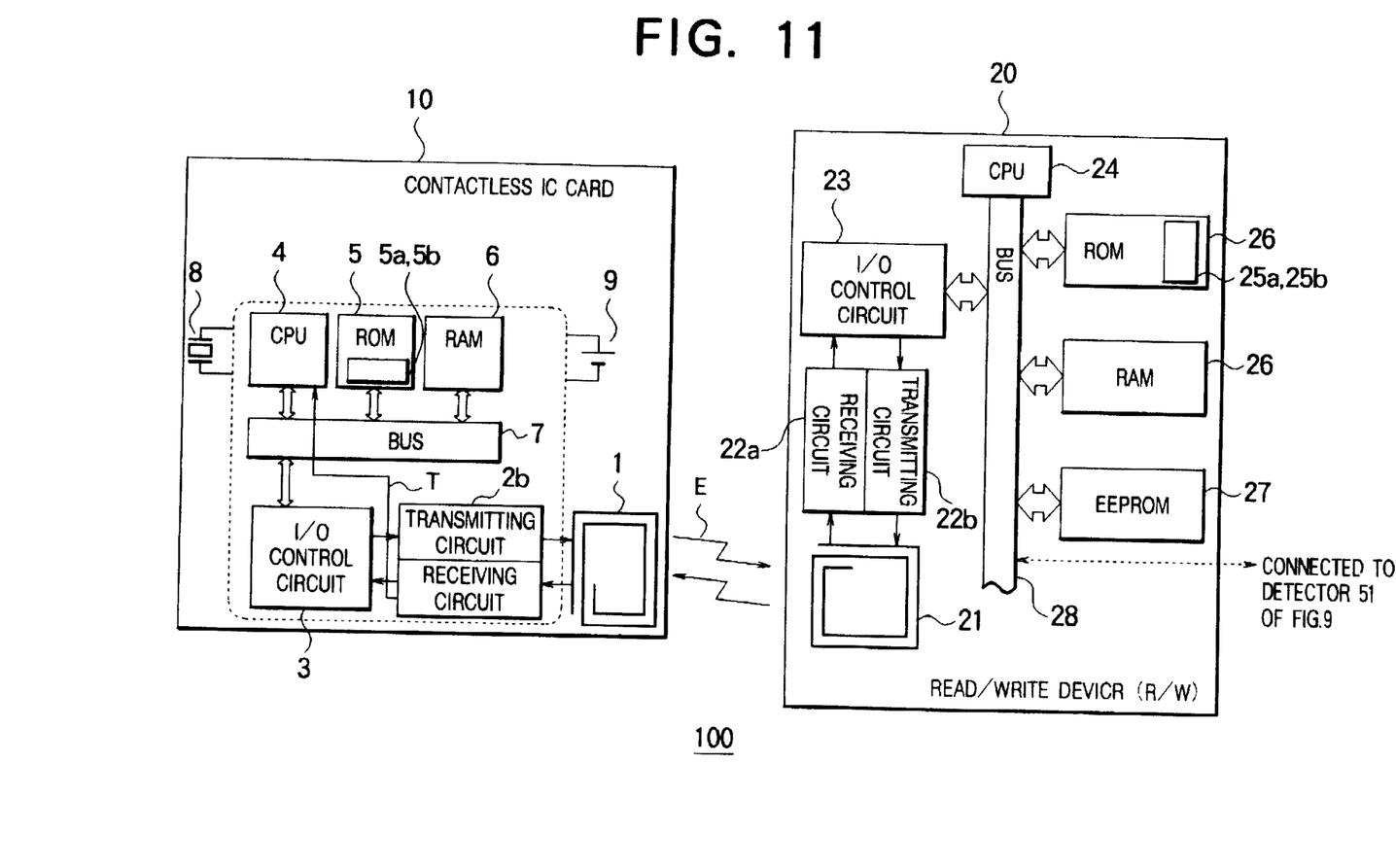
FIG. 11 shows the construction of a contactless IC card system to which the present invention may be applied.

FIG. 11 is a block diagram schematically showing the construction of a contactless IC card system of the type to which the present invention may be applied. In this figure, a contactless IC card system 100 includes a contactless IC card (hereinafter referred to simply as a card) 10 and a read/write device (hereinafter referred to as W/R) 20. The contactless IC card system 100 usually comprises one R/W 20 and a plurality of cards 10.

The card 10 generally includes: an antenna 1 for performing receiving/transmitting of data from/to the R/W 20 by means of electromagnetic wave as indicated by "E"; a receiving circuit 2a for demodulating a signal received at the antenna 1; a transmitting circuit 2b for modulating a signal to be transmitted and driving the antenna 1 and an I/O control circuit 3 for the serial/parallel conversion of the transmitting signal and reception signal.

The IC card 10 also includes: a CPU 4 for performing writing/reading operations on data (including transmitting/receiving of data) as well as various data processing; a ROM 5 for storing a control program 5a or the like to operate the CPU 4 in a manner as described; a RAM 6 for storing, for example, the result of processing; and a bus 7 for interconnecting the CPU 4, ROM 5, RAM 6 and I/O control circuit 3.

An oscillating element 8 generates an internal clock for the card 10 and a battery 9 provides power. The line denoted by "T" is a trigger signal line for turning the card 10 from its sleep state to operating state by directly supplying a received trigger signal to the CPU 4 from the receiving circuit 2a.

The R/W 20 fundamentally has a similar structure as the card 10. The R/W 20 generally includes: an antenna 21 for performing transmitting/receiving of data to/from the card 10 by means of electromagnetic wave "E"; a receiving circuit 22a for demodulating a signal received by the antenna 21; a transmitting circuit 22b for modulating a signal to be transmitted and transmitting it by driving the antenna 21; and an I/O control circuit 23 for effecting a serial/parallel conversion of the transmitting signal and reception signal.

The R/W 20 also generally includes: CPU 24 for performing writing/reading operation on data (including transmitting/receiving of data) as well as various data processing; a ROM 25 for storing a control program 25a or the like to operate the CPU 24 in a manner as described; a volatile RAM 26 for temporarily storing data; a nonvolatile EEPROM 27 For temporarily storing the result of processing; and a bus 28 for interconnecting the CPU 24, ROM 25, RAM 26, EEPROM 27 and I/O control circuit 23. It should be noted that a power supply and the portion for generating a clock for the R/W 20 are not shown. A broken line as indicated in FIG. 11 will be described subsequently.

In a contactless IC card system as described above, since data communication may be performed from/to a physically separated position, there may be the event in which a plurality of cards entering into an area where communication to/from the R/W 20 is possible. In such a case, interference can occur and normal communication cannot be performed. As means for eliminating such disadvantage, the following systems (referred to as ANTI-COLLISION) have been proposed.

In Japanese Patent Publication No. 3-2271 (Prior Art Example 1), the interval of response signal (identification code) consecutively (repeatedly) output from the card is varied in a pseudo-random manner, so that it will not be overlapped by a response signal from another card. An occurrence of interference is determined from the fact as to whether a predetermined code is included in the received data. The card varies the code interval by transmitting identification code to a time slot which is selected from a predetermined number of time slots (fixed length of time period during which an identification code may be transmitted) in a pseudo-random manner.

In Japanese Patent Publication No. 6-1512 (Prior-Art Example 2), the output timing of a response signal of the card is delayed in accordance with the content of a response order memory so that the response signal will not be overlapped by another response signal. The content of the response order memory is different from one card to another.

In Japanese Patent Publication No. 4-49078 (Prior Art Example 3), an inherent (fixed) response delay time is provided for each of the cards to avoid an overlapping of response signals.

Japanese Patent Laid-Open No. 2-226392 (Prior Art Example 4) employs a system in which the outgoing level of power is gradually lowered to narrow the area capable of communication to recognize a particular card.

In Japanese Patent Laid-Open No. 2-226390 (Prior Art Example 5), each card transmit its ID code respectively at the time of entering and exiting the communication range to reduce the probability of ID codes being simultaneously output.

In Japanese Patent Laid-Open No. 2-148282 (Prior Art Example 6), a response signal returned after an elapsed time period from a reference point in time of the providing of a periodic signal is detected as a read information. Specifically, reflection of an electromagnetic wave is utilized.

In Japanese Patent Laid-Open No. 5-159114 (Prior-Art Example 7), temporary IDs are given to a plurality of cards entering into the communication area in their order of entrance so as to process the plurality of cards within the communication area.

The conventional contactless IC card systems constructed as described have certain disadvantages.

First, in Prior-Art Example 1, since a predetermined time slot number and receiving mode is set for the read/write device even when only one card has entered into the communication area, a longer processing time results as a next inquiry signal cannot be transmitted. Further, when a large number of cards exist within the communication area, it is necessary to provide a larger number of time slots, resulting in a further increase in the processing time.

Similarly, in Prior-Art Example 4, if a large communication area is set on the assumption that a large number of cards exist within the communication area, the processing speed becomes slower.

The systems in prior art examples 2 and 3 are not practical if a large number of cards are to be used in one system. If an inherent delay time which is different from another is provided to all the cards, the delay time can be enormous. Further, if a group of cards are provided with a common delay time, reading of the data is impossible when cards of the same group have entered into the communication area.

Further, in prior art examples 5 and 7, processing is impossible in the case of simultaneous entry into (simultaneous exiting from) the communication area. Here, the word "simultaneous" refers to an occurrence within a time period which is required for transmission of an ID code. Furthermore, in prior art example 6, only the cards located within a predetermined distance range from the R/W can be processed.

SUMMARY OF THE INVENTION

To eliminate the above described problems, it is an object of the present invention to provide a contactless IC card system and communication method thereof in which: even when a plurality of cards have entered into a communication area, the cards within the communication area may be accessible; even if a collision of data occurs, the order of accessing is expeditiously determined to access again in accordance with such order; and it is possible to perform an efficient communication where the processing time as a whole may be shortened.

In view of the above objects, a contactless IC card system including contactless IC cards and a read/write device to perform communication by means of an electromagnetic wave is provided in accordance with a first aspect of the invention, including ID code acquisition means for reading the ID codes of the contactless IC cards by the read/write device and data communication means for identifying contactless IC cards for communication based on the obtained ID codes to cause respective commands to be executed. The ID code acquisition means determines each timing period at which the respective contactless IC card returns a response block containing an ID code based on the conditions directed to the respective card from the read/write device and the own ID code. It causes the read/write device to receive the response block returned by the contactless IC card and to detect a data collision. Based on this result, the read/write device is caused to request returning of a response block containing ID code with conditions being changed to concurrently process a plurality of contactless IC cards.

In accordance with a second aspect of the invention, the ID code acquisition means of the contactless IC card system according to the first aspect concurrently executes ID code acquisition and data communication for executing respective commands with contactless IC cards for communication being identified based on obtained ID codes by means of one command block transmitted by the read/write device.

In accordance with a third aspect of the invention, the contactless IC card system according to the first aspect further includes counting means for counting contactless IC cards entering into the communication area within a predetermined time period, and the ID code acquisition means determines the number of returning timings for a response block containing an ID code based on a count result of the counting means.

In accordance with a fourth aspect of the invention, a communication method for a contactless IC card system including contactless IC cards and a read/write device for performing communication by means of an electromagnetic wave is provided, including the steps of: ID code acquisition for reading the ID codes of the contactless IC cards by the read/write device; and data communication for identifying contactless IC cards for communication based on the obtained ID codes to cause respective commands to be executed. In the ID code acquisition step, the respective timing at which each contactless IC card returns a response block containing an ID code is determined based on the conditions directed to the respective card from the read/write device and the ID code of its own. It causes the read/write device to receive the response block returned by the contactless IC card and to detect a data collision. Based on this result, the read/write device generates a request for return of a response block containing ID code again with conditions being changed so as to concurrently process a plurality of contactless IC cards.

In accordance with a fifth aspect of the invention, in the ID code acquisition step of the communication method for a contactless IC card system according to the fourth aspect, ID code acquisition and data communication for executing respective commands with contactless IC cards for communication being identified based on obtained ID codes are concurrently executed by means of one command block transmitted by the read/write device.

In accordance with a sixth aspect of the invention, the communication method for a contactless IC card system according to the fourth aspect further includes a counting step for counting contactless IC cards entering into the communication area within a predetermined time period, and the number of returning timings for a response block containing an ID code is determined in the ID code acquisition step based on a count result of the counting step.

The system according to the first aspect of the invention includes: ID code acquisition means for reading the ID codes of the contactless IC cards by the read/write device and data communication means for identifying contactless IC cards for communication based on the obtained ID codes to cause respective commands to be executed. Each timing at which the respective contactless IC card returns a response block containing an ID code is determined by the ID code acquisition means based on the conditions directed to the respective card from the read/write device and its own ID code. It causes the read/write device to receive the response block returned by the contactless IC card and to detect a data collision. Based on this result, the read/write device generates a request for return of a response block containing ID code with conditions being changed to concurrently process a plurality of contactless IC cards.

In the system according to the second aspect of the invention, the ID code acquisition means concurrently executes ID code acquisition and data communication for executing respective commands with contactless IC cards for communication being identified based on obtained ID codes by means of one command block transmitted by the read/write device.

The system according to the third aspect of the invention further includes counting means for counting contactless IC cards entering into the communication area within a predetermined time period. The ID code acquisition means determines the number of returning timings for a response block containing an ID code based on a count result of the counting means.

The communication method according to the fourth aspect of the invention includes the steps of: ID code acquisition for reading the ID codes of the contactless IC cards by the read/write device; and data communication for identifying contactless IC cards for communication based on the obtained ID codes to cause respective commands to be executed. In the ID code acquisition step, the respective timing at which each contactless IC card returns a response block containing an ID code is determined based on the conditions directed to the respective card from the read/write device and the ID code of its own. It causes the read/write device to receive the response block returned by the contactless IC card and to detect a data collision. Based on this result, the read/write device is caused to request returning of a response block containing ID code again with conditions being changed so as to concurrently process a plurality of contactless IC cards.

In the ID code acquisition step of the communication method according to the fifth aspect of the invention, ID code acquisition and data communication for executing respective commands with contactless IC cards for communication being identified based on obtained ID codes are concurrently executed by means of one command block transmitted by the read/write device.

The communication method according to the sixth aspect of the invention further includes a counting step for counting contactless IC cards entering into the communication area within a predetermined time period. Number of returning timings for response block containing an ID code is determined in the ID code acquisition step based on a count result of the counting step.

DESCRIPTION OF THE PREFERRED EMBODIMENTS

The present invention will now be described in accordance with the accompanying drawings.

The construction of a contactless IC card system according to the invention is fundamentally identical to that shown in FIG. 11 except that the contents of control program 5b stored in the ROM 5 of the card 10 and control program 25b stored in the ROM 25 of the R/W 20 are different from the conventional programs 5a, 25a, respectively. Accordingly, FIG. 11 will be regarded as showing the construction of contactless IC card system according to the present invention.

It should be noted that the ID code acquisition means and data communication means in the first through third aspects of the invention comprise the hardware as shown in FIG. 11 and the above described control programs 5b, 25b.

The card 10 includes the CPU 4, serving as a microcomputer, and the battery 9. When not in communication with the R/W 20, the card 10 is usually in its sleep state to reduce consumption of the battery 9. It is started to perform communication upon a reception of a trigger signal which is transmitted from the R/W 20.

The fundamental operation of the card 10 of FIG. 11 is briefly described below. Communication by means of an electromagnetic wave E between the card 10 and the R/W 20 is performed in the manner of a serial transmission. The electromagnetic wave E received at the antenna 1 is amplified and demodulated at the receiving circuit 2a and is input to the I/O control circuit 3 as a digital signal. It is converted into parallel data at the I/O control circuit 3. A trigger signal T from the receiving circuit 2a serves as the signal for starting the CPU 4.

The CPU 4 operates according to the control program 5b stored in the ROM 5. In accordance with commands and data input from the I/O control circuit 3 through the bus 7, it executes writing/reading to/from the RAM 6 and processing, for example, the transmission of a response. In the case of a transmitting operation, the CPU 4 inputs transmitting data to the I/O control circuit 3 through the bus 7. The transmitting data, in the form of a parallel data, is converted into serial data by the I/O control circuit 3 and is output to the transmitting circuit 2b. The transmitting circuit 2b effects modulation in accordance with such data and transmits electromagnetic wave E by driving the antenna 1.

In the following embodiments, it is assumed that the system of the present invention is applied to controlling over the history of entry/exit of a room, or to a dynamic investigation persons or articles, i.e., provided are the system and communication method suitable for identifying a plurality of persons (articles) each possessing a card 10 who approach a single R/W 20 in an unspecified order.

EMBODIMENT 1

In a first embodiment of the invention, a peculiar code (hereinafter referred to as ID code) is given to each card. This is usually stored in a memory within each card when issuing the card. Timing at which a response is to be returned is directed from the R/W by using such ID code to avoid a collision of data.

The communication method according to the first embodiment includes an ID code acquisition step for acquiring ID codes of all the cards within a communication area and a data communication step for performing communication by means of time-division using the obtained ID codes.

In the ID code acquisition step, if a collision of ID codes occurs, the R/W resends to the cards a conditional ID code request command for directing timings at which the ID codes are to be returned. Each card determines the time period from the completion of receiving of the command to providing of the ID code based on the conditions designated by the R/W.

A method of communication of the invention will now be described with reference to FIG. 1 and 2. In this example, it is assumed that there are three cards A, B, C existing within the communication area. An 8-bit ID code is provided for each card and the codes are represented as $00_{16}$, $01_{16}$, $03_{16}$ by hexadecimal notation, respectively. (Starting)

Figure 1:
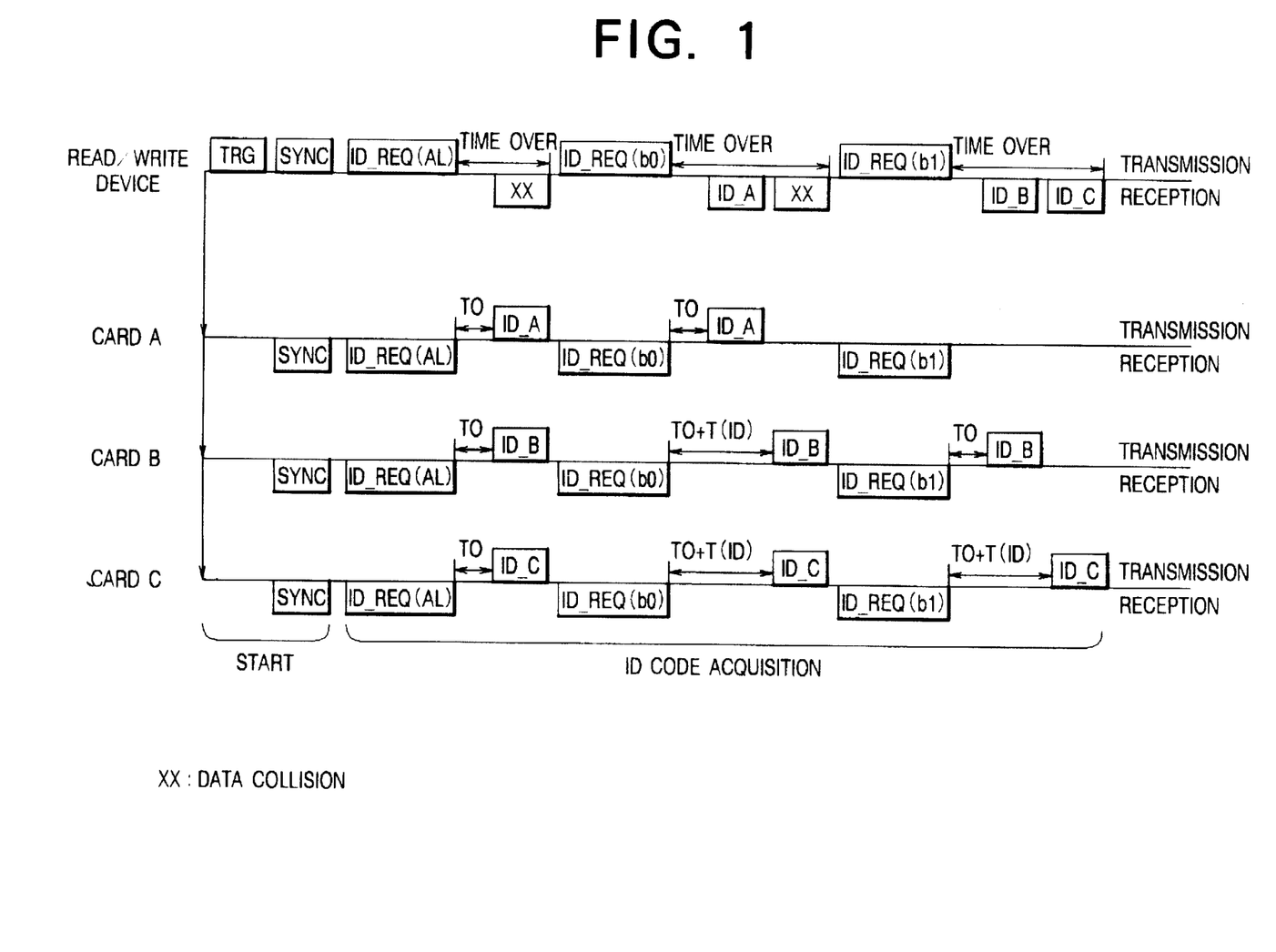
FIG. 1 shows the starting of the communication sequence and ID code acquisition process according to a first embodiment of the invention.
Figure 2:
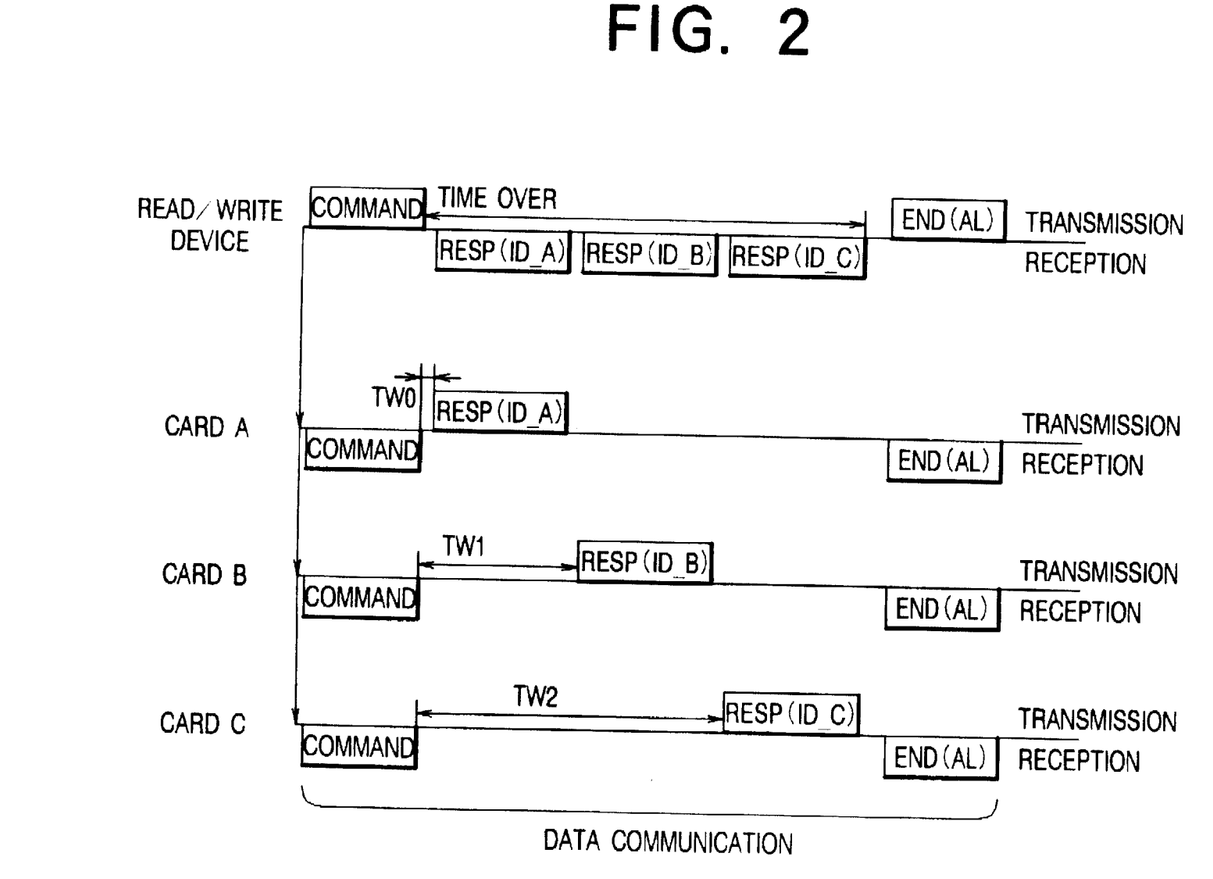
FIG. 2 shows a data communication process of a communication sequence according to the first embodiment of the invention.

(1) As shown in FIG. 1, the R/W (read/write device) provides a trigger signal TRG to start the cards. For example, the TRG may be a carrier which is not modulated. Following the TRG, a code SYNC for indicating a start of the communication process is transmitted.

(2) After started by TRG and receiving SYNC, a command process is started (processing of a command is enabled).

Here, if SYNC is provided with a code for indicating a point in time of communication to discriminate each communication from another, it is advantageous in avoiding an overlap processing of a card. Having received SYNC, the card compares it with the last communication point in its own time and, only if a predetermined time period has elapsed, receiving of the command is continued. Processing of the cards without an elapse of such time period is already complete in the last communication.

Further, since a card entering into the communication area during a communication process does not receive SYNC, no command processing is performed and a response is not returned. For this reason, no disorder occurs in the ID code acquisition process (step) to be described subsequently and the card which has previously entered into the communication area may be processed with a priority.
(Acquisition of ID codes)

(3) The R/W provides an ID code request command ID_REQ(AL). The ID_REQ(AL) is a command block requesting all the cards to return a respective ID code. This command block will be described subsequently in detail.

(4) After receiving and decoding such command block, all the cards promptly return response blocks containing the ID code, respectively. These response blocks (ID_A~ID_C) are provided after a time period T0 from the completion of reception of the command block ID_REQ(AL). The response blocks are described subsequently.

(5) The R/W detects an occurrence of data collision by checking the parity, occurrence of a framing error, error check code ECC, etc. If an error occurs, it transmits ID_REQ(b0) which is a conditional ID code request command with regarding all the cards as the candidates for processing. The ID_REQ(b0) is a command for shifting the output timing of the response block by checking the least significant bit [LSB(0 bit)] of the ID code.

Here, if no data is received in a predetermined time period, it is regarded as a "time over" and the R/W starts executing again from providing of TRG. If only one card exists in the communication area, since no collision of ID codes occurs, the system proceeds to data communication as shown in FIG. 2.

(6) Each card checks the least significant bit of the ID code. It returns the ID code promptly if the LSB is "0" or after waiting one response block length T(ID) of the ID code if "1". At this time, time from completion of reception of the command block to providing of the response block containing an ID code is T0 (T0 being command processing time of the card) if LSB is "0" or is T0+T(ID) if LSB is "1". It is T0 for the card A and T0+T(ID) for the cards B and C.

(7) The R/W receives two response blocks and checks an error thereof. The ID code of the response block without an error is stored. In order to separate the response block with an error (causing data collision as indicated by XX in FIG. 1), ID_REQ(b1) is transmitted so that it is executed by the cards having "1" for LSB of ID code. (This may be described using an example of command block shown in FIG. 3A to be described subsequently as "STCR LEN ID_REQ b1 (???????0) 0 ECC".)

(8) Since the card A is not a candidate for executing the command, it does not return a response. The cards B, C check the bit at the second lowest order digit. Since, in this case, offset time is "0" (portion of TOF1 of FIG. 3A), they return a response at timings T0, T0+T(ID), respectively.

(9) The R/W receives the responses and checks for an error. If all the blocks are free from an error, the ID code acquisition process (step) is completed after storing the obtained ID codes and the system proceeds to data communication process (step) as shown in FIG. 2.
(Data communication)

(10) The R/W transmits a command block COMMAND which is obtained by adding ID codes to a command and receives responses from the cards. Examples A, B of command block are described below. Example A is a format for requesting individual processing by each card where a plurality of sets of command and ID codes exist within the block. Example B is a format for causing all the cards to execute the same command.

(11) Each card receives and interprets the COMMAND block. It executes those commands to which its ID is added and transmits a response after waiting a directed time period.

(12) The R/W receives and processes responses from the respective cards in a time-divisional manner and transmits a termination command END(AL).

(13) Each card receives the termination command and returns to its sleep mode.

Figure 3A:
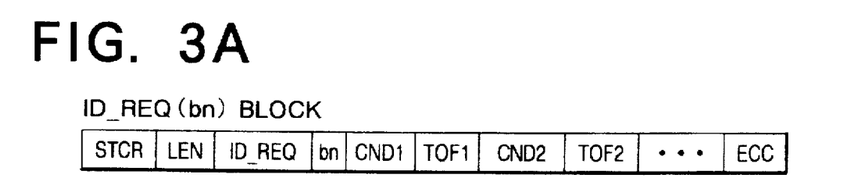
FIGS. 3A to 3C each shows a command block in the first embodiment of the invention.
Figure 3B:
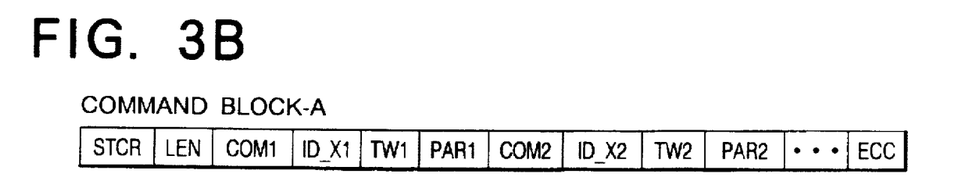
Figure 3C:
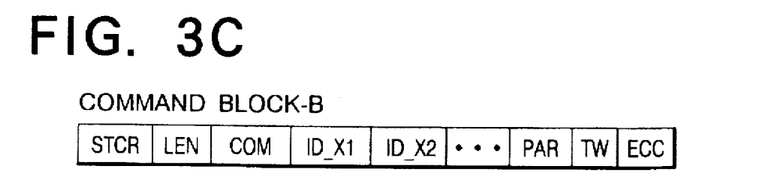

Examples of character format for a command block are shown in FIG. 3A to 3C. STCR is a code for indicating the start of a command block transmitted by the R/W and LEN indicates a block length. ECC is an error check code for the block [check sum, CRC (cyclic redundancy code), etc.].

The ID_REQ(bn) block of FIG. 3A will now be described. ID_REQ is a command code for requesting returning of ID code, "bn" being a code for indicating a bit position (bit n:n=0, 1, 2, 3) to be checked. CND is a code for indicating the cards which are the candidates for executing the command, i.e., the code indicates, for example, a card group having a value of "0" for LSB of ID code.

CND and TOF form a pair, where TOF is the offset time when the cards of a group specified by CND are to provide response block. Each card of the group indicated by CND checks the "bn" bit and returns a response at a timing of T0+TOF or T(ID)+TOF. If candidate cards for executing the command are not specified, the codes of CND and thereafter are not required. Further, in the case of ID_REQ(AL), the codes that follow "bn" are not required. However, ECC is required.

The COMMAND blocks A, B of FIG. 3B and 3C will now be described. The command block A contains sets each including: a command COM; ID code ID_X for indicating candidate card for executing the command; TW for designating delay time (waiting time) for transmission of a response; and PAR, the parameter necessary for executing the command, for example, which is an address and write data in the case of a write command. The number of such sets corresponds to the acquired ID codes. Each card receives the command block and executes a command corresponding to its ID code. It transmits a response after a waiting time designated by TW.

The COMMAND block A is used when requesting a different processing for each card. Since, usually, execution of processing common to the cards is more likely, the COMMAND block B is more effective in such a case. The block B contains: a command code COM; ID code ID__ of the card to be processed; PAR necessary for executing the command; and TW indicating a waiting time. In the case of a common command, since the response length is constant, one TW suffices (i.e., TW may be a transmitting time period for a response). Each card receives such command block and executes the common command. Thereafter, it transmits a response after waiting an integer-multiple of the time period designated by TW corresponding to the order of its ID code. In this example, as shown in FIG. 2, such waiting time is TW×0 for card A, TW×1 for card B and TW×2 for card C.

Figure 4:
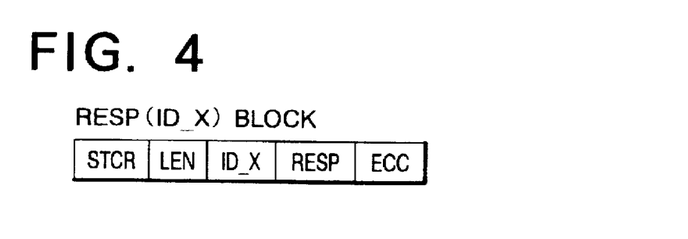
FIG. 4 shows a response block in accordance with the first embodiment of the invention.

An example of character format for a response is shown in FIG. 4. STCC is the code for indicating the start of a response block transmitted by R/W, and LEN and ECC are identical as those in a command block. A response block contains a respective ID code ID_X and the result of processing of the command RESP. In the case of a response to an ID requesting command, RESP is not required.

The algorithm of the ID code acquisition process will now be described with reference to FIG. 5. Fundamentally, if a data collision occurs, conditions are added so as to separate it into two different timings. In other words, the R/W transmits an ID code request command so that the bit at a more higher order position is checked and the output timing is changed into two types depending on whether such bit is "1" or "0" Two type of timings are provided because it is the smallest number necessary for separating a collision.

Figure 5:
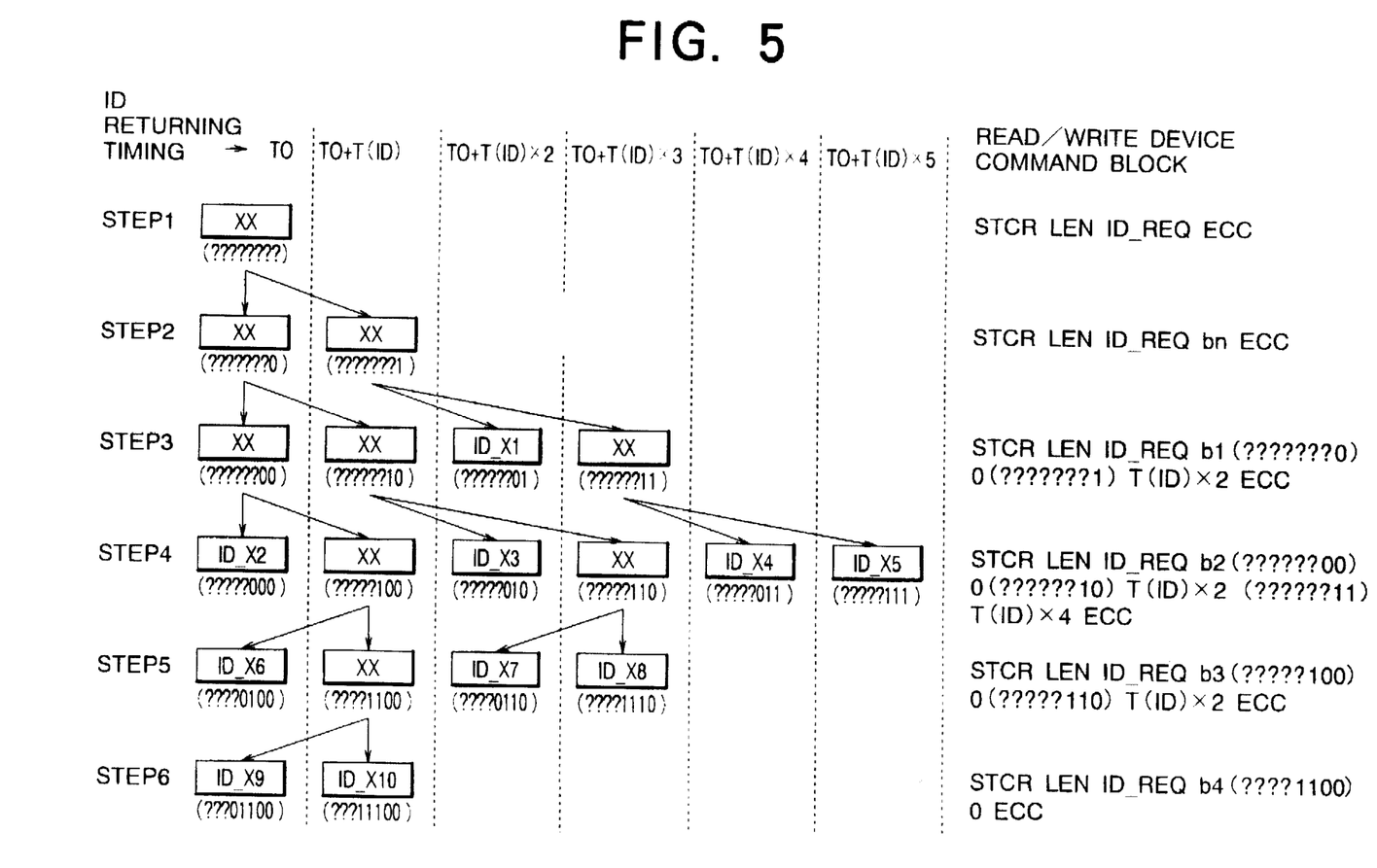
FIG. 5 shows a processing flow of the ID code acquisition process according to the first embodiment of the invention.

In FIG. 5, an 8-bit ID code is assumed and is represented for example as ????0100. Here, a "?" is undefined and may be either "1" or "0". The block with (????0100) means that all the cards corresponding to this ID code return a response at the timing where the block is located. "T0,T0+T(ID) . . . (T0 being T0+T(ID))" is the time period for providing of an ID code after completion of reception of the ID code request command. An "XX" represents a data collision and ID_X represents an ID code normally received by the R/W or the state of no reception data. Further, command blocks for obtaining the responses of STEPS 1 to 6 are shown in accordance with the above described character format examples.

Upon transmitting of the command block ID_REQ(AL) by the R/W at STEP 1, all the cards within the communication area return ID codes at timing T0. At this time, if a data collision occurs, existence of a plurality of cards is presumed. At STEP 2, the R/W transmits ID_REQ(b0) to separate it into two elements and receives responses.

Here, if data collision occurs at timings of both T0 and T0+T(ID), cards of ID code (???????0) and of ID code (???????1) exist both in a plural number. At STEP 3, in order to separate this, the R/W transmits ID_REQ(b1) respectively to the cards of (???????0) and (???????1). As a result, responses are returned to the cards corresponding to (??????00) and (??????10) respectively at timings of T0 and T0+T(ID) and of the cards corresponding to (??????01) and (??????11) respectively at timings of T0+T(ID)×2 and T0+T(ID)×3. If, as a result, ID_X1 is normally received, this is stored. For the conditions resulting in an occurrence of data collision, branching of the conditions further proceeds in a manner similar to the above. In this way, branching of the conditions is repeated until all the data collisions are eliminated.

In the above described embodiment, the R/W in the ID code acquisition process is able to decompose data collisions by suitably adding conditions based on the responses from the cards.

Also, in processing a card, the R/W will not wastefully wait for a reception of data for a lengthy time period. Further, it is able to promptly transit to providing of next trigger even when no card exists within the communication area.

Since the system does not depend on any contingency such as an individual delay for each card or random numbers in avoiding a collision, it is possible to positively identify the ID codes and an average processing time per card may be shortened even when a large number of cards are to be concurrently processed.

It should be noted that, in the above embodiment, the conditional expression for designating output timing of the ID code is to indicate bit position in an ID code and timing is determined based on whether the bit is "1" or "0". However, it is also possible, for example, to designate a certain value as a conditional expression so that timing is determined based on whether the ID code is larger or smaller than such designated value.

While, in the above embodiment, two types conditional branches are provided when a data collision occurs, 4 types, 8 types . . . may be provided by setting the number bits to be checked to 2 bits, 3 bits . . .

Further, while, in the above embodiment, the check bit for branching the conditions is shifted sequentially from a lower order position to upper order position, it may be shifted in a skipping manner. Especially, such as when a coincidence is confirmed of a plurality of cards by data collision, separation may be expedited by skipping that particular bit. For example, if no electromagnetic wave is to be emitted for a transmission data "1" in ASK (amplitude shift keying) modulation, bits for which received collision data are data "1" may be almost always skipped.

EMBODIMENT 2

A second embodiment of the present invention is a modification of the first embodiment, where a transition to data communication is effected as soon as at least one ID code is obtained in the ID code acquisition process and, at the same time, the ID code acquisition is further continued so that data communication is sequentially performed upon an acquisition of respective ID code. In this case, because data is sequentially processed in the order of acquisition of ID codes, earlier results may be obtained for those with shorter processing time. Since processing may be efficiently performed (processing speed appears to be higher), it is especially effective to those applications where result of processing is displayed to be seen by the user.

After normally receiving at least one ID code in the ID code acquisition process, while data communication is executed by a command to which the ID code is imparted, a conditional ID code request command is added to this command string when an error due to data collision is furthermore detected. Thereby, returning of the ID code is directed at a different timing from the response made by the previous data communication.

Figure 6:
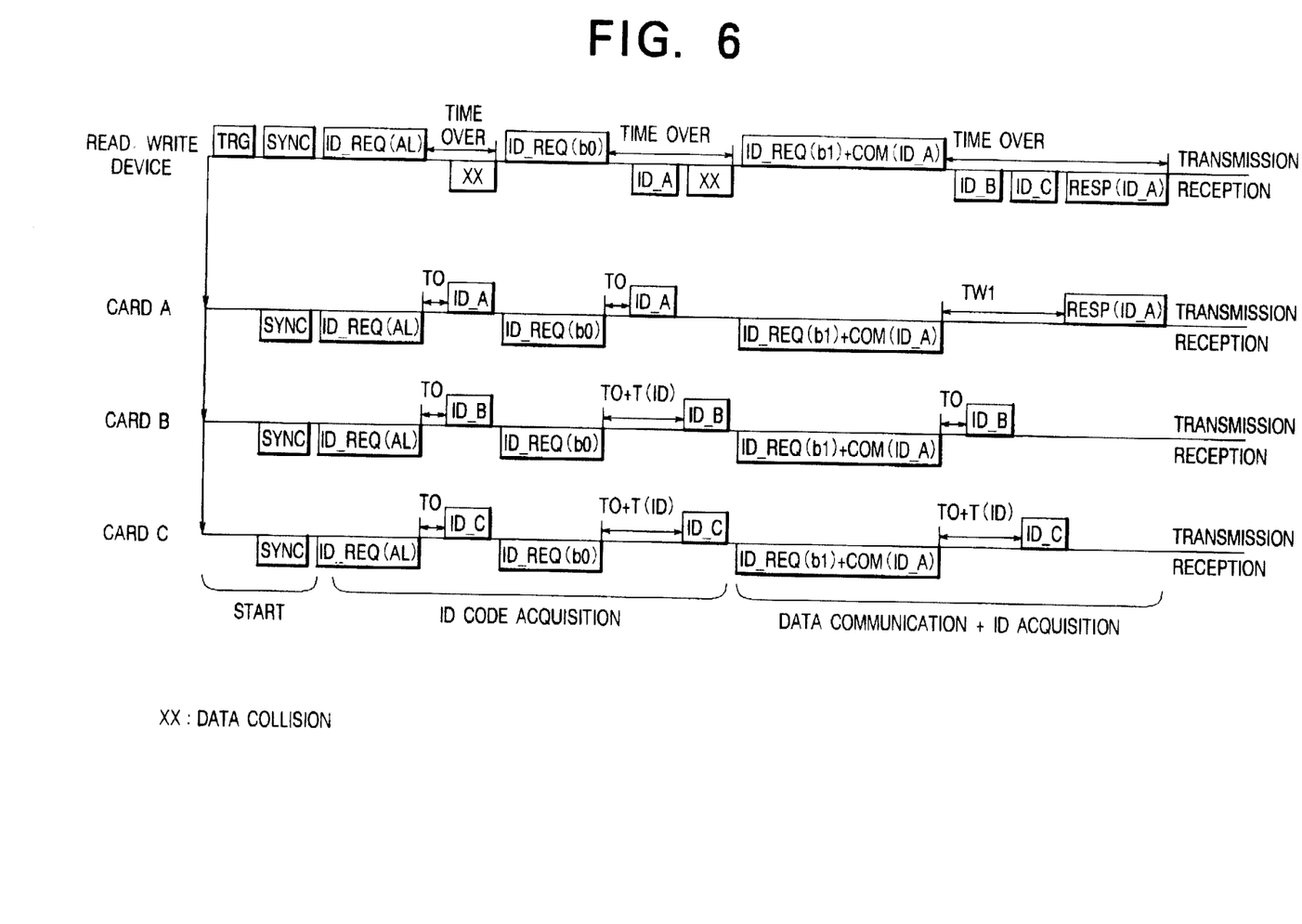
FIG. 6 shows the starting of communication sequence, ID code acquisition and "data communication+ID acquisition" process according to a second aspect of the invention.
Figure 7:
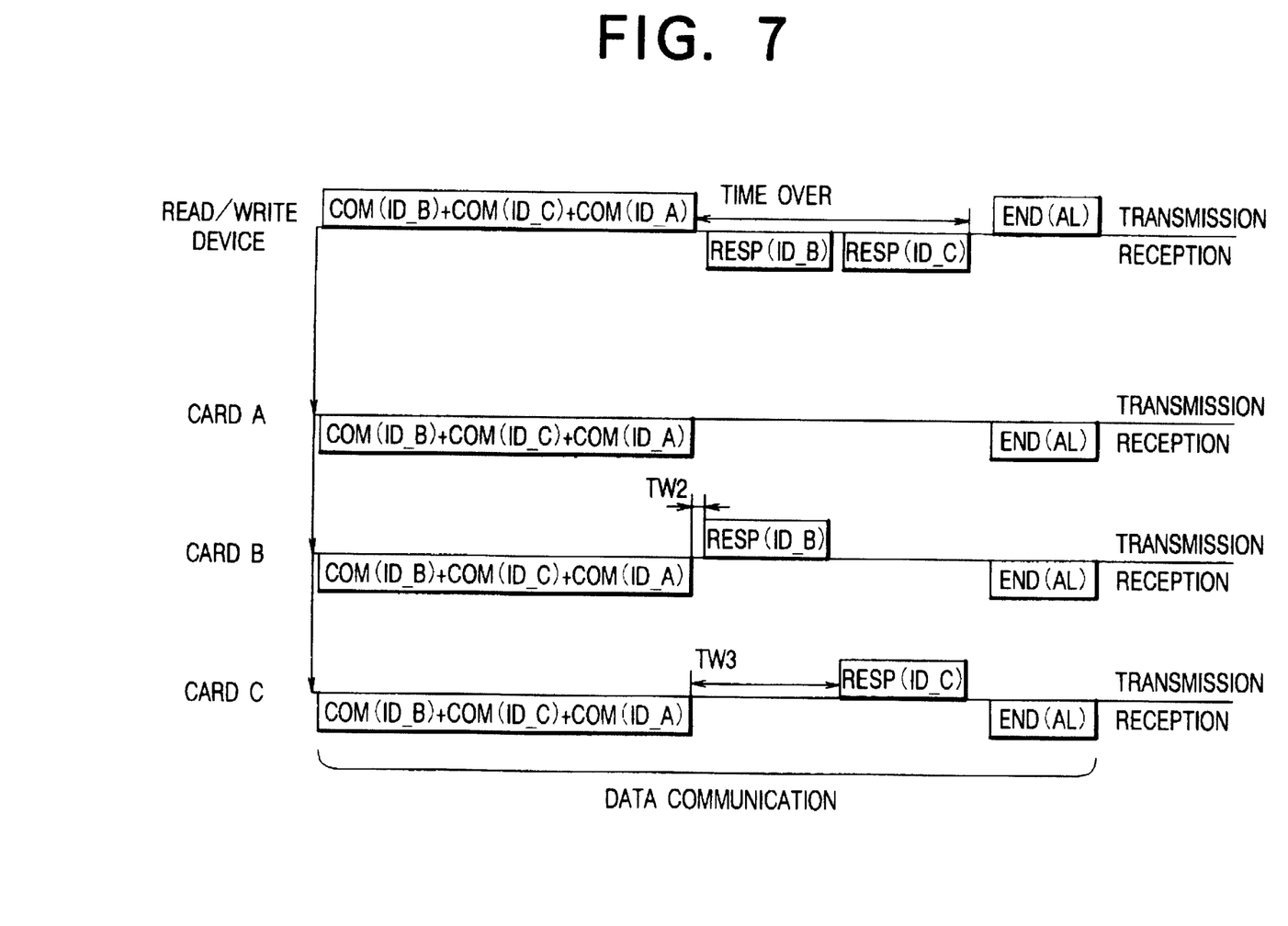
FIG. 7 shows a data communication process of communication sequence according to the second embodiment of the invention.
Figure 8:
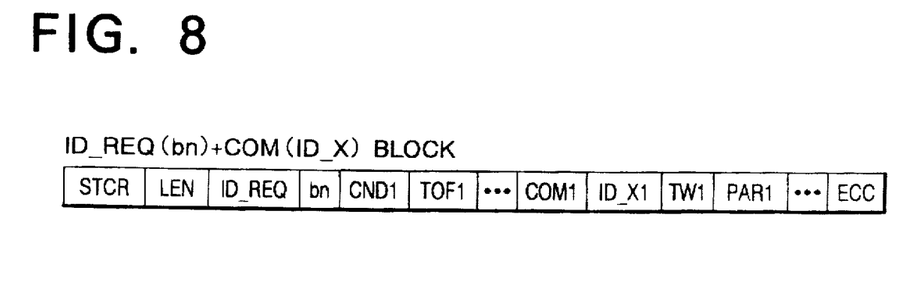
FIG. 8 shows a command block in accordance with the second embodiment of the invention.

Operation of this embodiment will now be described using FIG. 6 to 8. The sequence of starting and ID code acquisition process is identical to the foregoing embodiment.

When at least one ID code is obtained in the ID code acquisition process, the R/W transmits a command block "ID_REQ(b1)+COM(ID_A)" by adding a data communication command to an ID code request command, so as to concurrently perform acquisition of ID code and data communication. An example of such composite command block is shown in FIG. 8. This is formed as combining the command blocks of FIG. 3A and 3B. The command string in this case is "STCR LEN ID_REQ b1 (???????1) 0 COM ID_A T(ID)×2 PAR ECC".

Each card executes a command directed thereto and returns response at a designated timing. The R/W receives this and transmits a command block which combines:

data communication command when a new ID code has been obtained;

termination command for the card with processing having been completed when a data communication has been complete; and ID code request command with further branched conditions when an error has been detected in a response block of ID code.

This is repeated until processing of all the cards is complete.

In this embodiment, earlier results may be obtained for those with shorter processing time and processing may be efficiently performed (processing speed appears to be higher). It is thus especially effective to those applications where a gate is to be opened based on the result of a data communication or where read out data is displayed to be seen by the user. Further, since data communication is effected immediately upon an acquisition of ID code, probability of the relevant card having left the communication area is small.

EMBODIMENT 3

In the ID code acquisition process of the first and second embodiments of the invention, a method is employed in which the ID code returning timing is started as a single timing and then it is sequentially branched into two elements. For this reason, if a large number of cards have simultaneously entered into the communication area, time is required for the convergence of ID code acquisition process. A method for mitigating this is shown in a third embodiment of the invention. Specifically, in the third embodiment, an assumption is made that the communication area is relatively large and that a large number of cards must be concurrently processed. A processing method suitable for such case will be described below.

Figure 9:
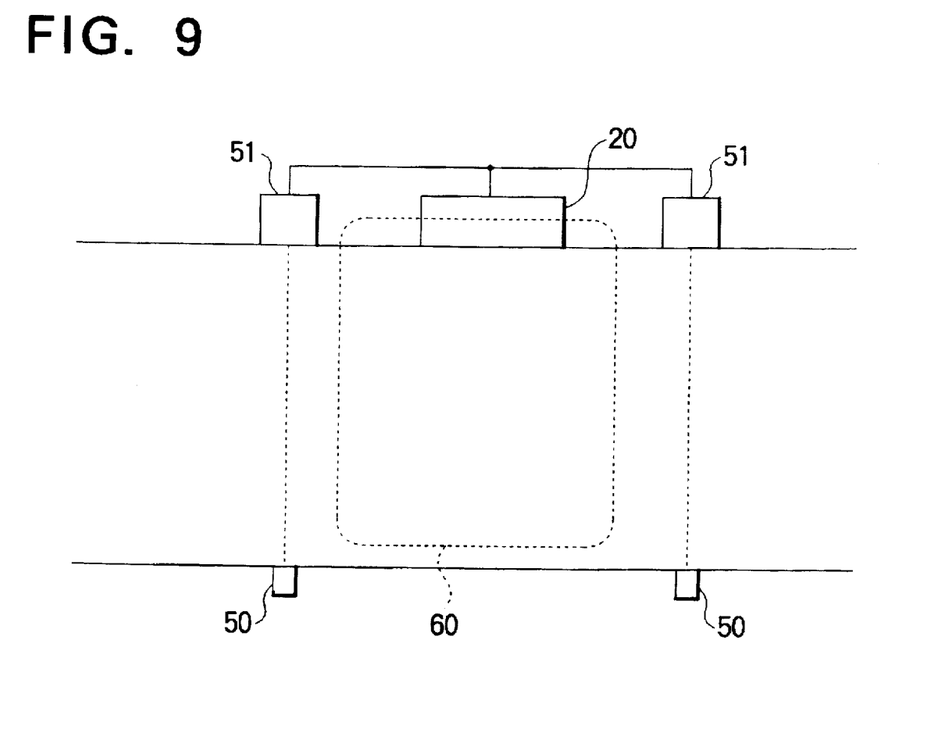
FIG. 9 shows the disposition of a read/write device of the system according to a third embodiment of the invention.

The construction of a contactless IC card system according to the third embodiment is shown in FIG. 9. The R/W 20 is provided with means for counting the number of objects that enter a communication area 60. In this example, it is constituted by pairs each including an infrared-emitting device 50 and detector 51. The detector 51 counts the number of passing objects based on cutoff of the infrared ray from the infrared emitting device 50. The count value is counted up from an outputting of SYNC of the R/W 20 to the next outputting of SYNC and is read and reset by the R/W at the time of the outputting of SYNC through the line indicated by the broken line in FIG. 11. Also, such counting of the number of passing objects may be performed at the CPU 24 by constituting a timer by means of a program at the R/W 20.

Figure 10:
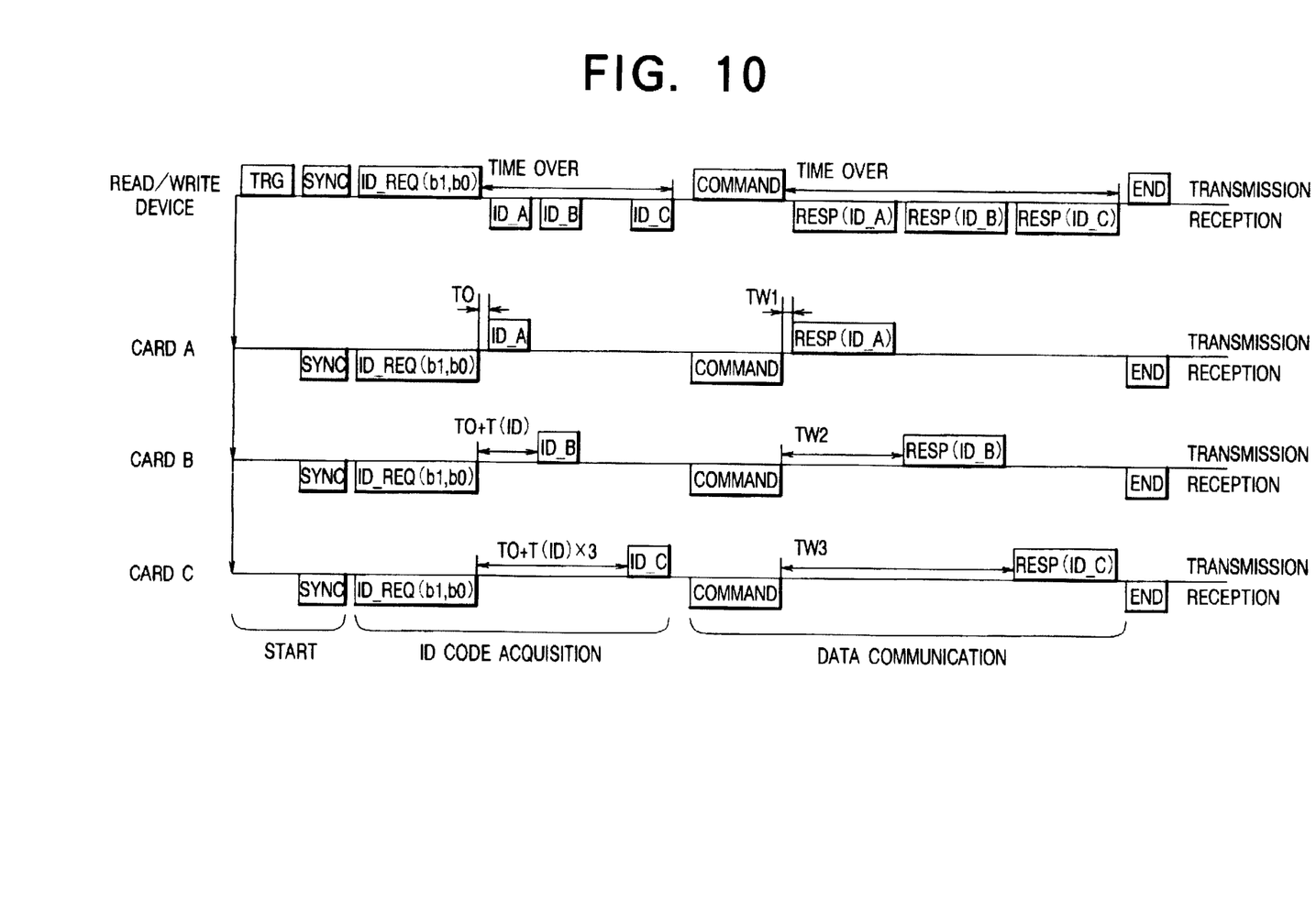
FIG. 10 shows a communication sequence according to the third embodiment of the invention.

The communication sequence of this embodiment is shown in FIG. 10. Cards A~C are identical to those of the first embodiment. After transmitting TRG, SYNC, the R/W provides an ID code request command. At this time, if the read count value is 3, the ID code request command is provided as ID_REQ(b1b0). The ID_REQ(b1b0) checks the bits of second low order digit (bit 1) and LSB (bit 0) and sets response returning timings to four types T0, T0+T(ID), T0+T(ID)×2, T0+T(ID)×3 corresponding to the combinations (0,0), (0,1), (1,0), (1,1) of (b1,b0). In other words, the command is defined so that the number of response returning timings is equal to or more than the count value. For example, if the count value is 5 to 8, the command is defined as $ID_{13}$ REQ(b2b1b0) so that eight different timings are provided.

In the example of FIG. 10, the R/W transmits ID_REQ (b1b0) addressing all the cards. The cards A to C return responses at the timings of T0, T0+T(ID), T0+T(ID)×3, respectively. In this case, since no data collision occurs, the R/W normally receives the ID codes and transition to data communication process is made.

Here, if a data collision occurs, the method of the first embodiment may be used to sequentially branch the conditions into two elements. Further, since the number of remaining cards may be seen by subtracting the number of obtained ID codes from the count value, it is even more efficient to define the command in such a manner that the number of response timings is always equal to or more than the number of remaining cards.

In this embodiment, convergence of the ID code acquisition process is greatly expedited.

In accordance with the first aspect of the invention as described, timing at which each contactless IC card returns a response block containing an ID code is determined by the ID code acquisition means based on the conditions directed by the read/write device and the ID code of the card. The read/write device is caused to receive response blocks returned by the contactless IC cards and to detect a data collision. Based on this result, the conditions are changed so as to request returning of a response block containing ID code again. Thereby, the read/write device directs the response returning timing based on ID code peculiar to each card. Since each card is completely identified and there is no wasteful waiting time, an advantage is achieved that it is possible to provide a contactless IC card system in which an average processing time per card is shorter and an efficient communication is performed.

In accordance with the second aspect of the invention, an ID code acquisition and data communication for executing a command by identifying a contactless IC card for communication from obtained ID code are concurrently executed by means of one command block transmitted by the read/write device. Earlier results may be obtained for those with shorter processing time and processing may be efficiently performed (processing speed appears to be higher). An advantage is thus achieved that it is possible to provide a contactless IC card system which is especially effective to those applications where a gate is to be opened based on the result of a data communication or where read out data is displayed to be seen by the user.

In accordance with the third aspect of the invention, contactless IC cards entering into the communication area within a predetermined time period are counted. The number of returning timings for response block containing an ID code is determined based on the count result of such counting means. An advantage is thus achieved that it is possible to provide a contactless IC card system in which convergence (completion) of ID code acquisition is greatly expedited and communication is performed with a higher efficiency.

In accordance with the fourth aspect of the invention, similarly to the first aspect, in the ID code acquisition step, timing at which a response block containing an ID code is returned is determined by each contactless IC card based on the conditions directed by the read/write device and its own ID code. The read/write device is caused to receive response blocks returned by the contactless IC cards and to detect a data collision. Based on this result, the conditions are changed so as to request returning of a response block containing ID code again. Thereby, the read/write device directs the response returning timing based on ID code peculiar to each card. Since each card is completely identified and there is no wasteful waiting time, an advantage is achieved that it is possible to provide a communication method of contactless IC card system in which an average processing time per card is shorter and an efficient communication is performed.

In accordance with the fifth aspect of the invention, similarly to the second aspect, an ID code acquisition and data communication for executing a command by identifying a contactless IC card for communication from the obtained ID code are concurrently executed by means of one command block transmitted by the read/write device. Earlier results may be obtained for those with shorter processing time and processing may be efficiently performed (processing speed appears to be higher). An advantage is thus achieved that it is possible to provide a communication method of contactless IC card system which is especially effective to those applications where a gate is to be opened based on the result of a data communication or where read out data is displayed to be seen by the user.

In accordance with the sixth aspect of the invention, similarly to the third aspect, contactless IC cards entering into the communication area within a predetermined time period are counted. Number of returning timings for response block containing an ID code is determined based on the count result of such counting means. An advantage is thus achieved that it is possible to provide a communication method of contactless IC card system in which convergence (completion) of ID code acquisition is greatly expedited and communication is performed with a higher efficiency.

What is claimed is:

1. A contactless IC card communication system including:
   contactless IC cards; and
   a read/write device communicating with the IC cards by means of electromagnetic waves, the read/write device comprising:
   ID code acquisition means for requesting a response block from each of the contactless IC cards and for determining a time at which each of the contactless IC cards returns a response block containing an ID code, based on timing conditions directed to the contactless IC cards from the read/write device and an ID code of each of the contactless IC cards;
   data communication means for identifying contactless IC cards for communication based on the ID codes and causing respective commands to be executed in the contactless IC cards identified;
   means for receiving a response block containing an ID code from each of the contactless IC cards and detecting a data collision between response blocks;
   means for changing the timing conditions in response to a data collision; and
   means for re-requesting a response block from each of the contactless IC cards using the changed timing conditions.

2. The contactless IC card communication system according to claim 1, wherein the ID code acquisition means concurrently requests response blocks from the contactless IC cards and sends data commands to contactless IC cards using a single command block transmitted by the read/write device.

3. The contactless IC card communication system according to claim 1, comprising counting means for counting contactless IC cards entering a communication area within a time period, and whereby the ID code acquisition means establishes a number of different timings for response blocks returned by the contactless ID cards based on based on a count of the counting means.

4. A communication method for a contactless IC card system, the system including contactless IC cards and a read/write device, for communicating by means of electromagnetic waves, the communication method comprising:
   acquiring an ID code from each of the contactless IC cards by requesting a response block from each of the contactless IC cards utilizing a read/write device and determining a time for each of the contactless IC cards to send a response block based on timing conditions directed to the contactless IC cards from the read/write device and the ID code of each of the contactless IC cards;
   receiving a response block from each of the contactless IC cards and detecting whether a data collision of response blocks has occurred;
   changing the timing conditions in response to a data collision;
   re-requesting a response block from each of the contactless IC cards using the changed timing conditions; and
   communicating data to identified contactless IC cards based on the ID codes thereby causing the identified contactless IC cards to execute commands.

5. The communication method for a contactless IC card system according to claim 4, including concurrently acquiring ID codes from the contactless IC cards and communicating data to the identified IC cards with a single command block transmitted by the read/write device.

6. The communication method for a contactless IC card system according to claim 4, comprising counting contactless IC cards entering a communication area within a time period to produce a count result, and establishing a number of different timings for return of response blocks based on the count result.

\* \* \* \* \*